United States Patent
Li et al.

(10) Patent No.: US 9,536,152 B2
(45) Date of Patent: Jan. 3, 2017

(54) METHODS AND SYSTEMS FOR MULTIMEDIA TRAJECTORY ANNOTATION

(71) Applicant: XEROX CORPORATION, Norwalk, CT (US)

(72) Inventors: Qun Li, Chicago, IL (US); Edgar A Bernal, Webster, NY (US); Wencheng Wu, Webster, NY (US); Beilei Xu, Penfield, NY (US); Robert P Loce, Webster, NY (US); Raja Bala, Pittsford, NY (US); Stuart A Schweid, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 227 days.

(21) Appl. No.: 13/767,658

(22) Filed: Feb. 14, 2013

(65) Prior Publication Data
US 2014/0226852 A1   Aug. 14, 2014

(51) Int. Cl.
*G06K 9/00* (2006.01)
(52) U.S. Cl.
CPC ................................ *G06K 9/00771* (2013.01)
(58) Field of Classification Search
None
See application file for complete search history.

(56) References Cited

U.S. PATENT DOCUMENTS

| | | | |
|---|---|---|---|
| 8,510,041 B1 * | 8/2013 | Anguelov et al. | 701/445 |
| 8,705,690 B2 * | 4/2014 | Jerebko | A61B 6/025 378/21 |
| 8,775,975 B2 * | 7/2014 | Karmarkar | G06F 3/013 345/473 |
| 8,788,502 B1 * | 7/2014 | Hensel et al. | 707/738 |
| 8,812,015 B2 * | 8/2014 | Das et al. | 455/456.1 |
| 2009/0055205 A1 * | 2/2009 | Nguyen et al. | 705/1 |
| 2009/0248305 A1 * | 10/2009 | Nakano | G06T 7/004 701/514 |
| 2009/0307618 A1 * | 12/2009 | Lawler et al. | 715/764 |
| 2010/0278453 A1 * | 11/2010 | King | 382/321 |
| 2011/0167078 A1 * | 7/2011 | Benjamin et al. | 707/769 |
| 2011/0172916 A1 * | 7/2011 | Pakzad et al. | 701/209 |
| 2011/0173150 A1 * | 7/2011 | van Zwol et al. | 706/50 |
| 2013/0330055 A1 * | 12/2013 | Zimmermann et al. | 386/240 |
| 2014/0115436 A1 * | 4/2014 | Beaver et al. | 715/229 |

OTHER PUBLICATIONS

Y. Nam, "Map-Based Indoor People Localization Using an Inertial Measurement Unit", Journal of Information Science and Engineering, 2011, vol. 27, pp. 1233-1247.

(Continued)

*Primary Examiner* — Nancy Bitar
(74) *Attorney, Agent, or Firm* — MH2 Technology Law Group LLP

(57) ABSTRACT

A system and method of providing annotated trajectories by receiving image frames from a video camera and determining a location based on the image frames from the video camera. The system and method can further include the steps of determining that the location is associated with a preexisting annotation and displaying the preexisting annotation. Additionally or alternatively, the system and method can further include the steps of generating a new annotation automatically or based on a user input and associating the new annotation with the current location.

15 Claims, 5 Drawing Sheets

(56) References Cited

OTHER PUBLICATIONS

J. Alonso et al., "Towards People Indoor Localization Combining WiFi and Human Motion Recognition", XV Congreso Espanol sobra Tecnolgias y Logica Fuzzy, 2010, pp. 1-6.
Hui Liu et al., "Survey of Wireless Indoor Positioning Techniques and Systems", IEEE Transactions on Systems, Man and Cybernetics, vol. 37, No. 6, Nov. 22, 2007, pp. 1067-1080.
Veljo Otsason et al., "Accurate GSM Indoor Localization", Ubiquitous Computing: 2005, pp. 141-158.
S. Suksakulchai et al, "Mobile Root Localization Using an Electronic Compass for Corridor Environment", Proc. IEEE Int Conf. on Systems, Man and Cybernetics, Oct. 2000, pp. 1-6.
H. Kim et al., "Advanced indoor Localization Using Ultrasonic Sensor and Digital Compass", Int. Conf. on Control, Automation and Systems, Oct. 2008, pp. 1-4.
O. Manu, "A Study of Indoor Localization Techniques", White Paper, pp. 1-6.
S. P. Tarzia et al., "Indoor Localization Without Infrastructure Using the Acoustic Background Spectrum". MobiSys 2011 Proceedings of the 9th International Conference on Mobile Systems, Applications, and Services, pp. 155-168.
J. Collin et al., "Indoor Positioning System Using Accelerometry and High Accuracy Heading Sensors", Proc. of GPS/GNSS Conference, 2003, pp. 1-7.
O. Eladio Martin et al., "Precise Indoor Localization Using Smart Phones", Proceedings of the International Conference on Multimedia (MM '10). ACM, 2010, pp. 787-790.
Peng Zhuang et al., "SMART: Simultaneous Indoor Localization and Map Construction Using Smartphones", The 2010 International Joint Conference on Neural Networks (IJCNN), pp. 1-8.
C. Pereira et al., "A Smart-Phone Indoor/Outdoor Localization System" 2011 International Conference on Indoor Positioning and Indoor Navigation, pp. 1-4.
A. Parnandi et al., "Coarse In-Building Localization with Smartphones", vol. 35, 2010, pp. 343-354.
Nisarg Kothari et al., "Robust Indoor Localization on a Commercial Smart-Phone", Tech. Report CMU-RI-TR-11-27, Robotics Institute, Carnegie Mellon University, Aug. 2011, pp. 1-11.
C. Wienke et al., "Indoor Positioning Using a Modern Smartphone", White Paper, 2010, pp. 1-8.
Nishkam Ravi et al., "Indoor Localization Using Camera Phones", Proceedings of the Seventh IEEE Workshop on Mobile Computing Systems & Applications: Supplement, 2006, pp. 1-7.
H. Lim et al., "Real-Time Image-Based 6-DOF Localization in Large-Scale Environments", In Proceedings of IEEE Conference on Computer Vision and Pattern Recognition, Providence, RI, 2012, pp. 1-8.
A, Azarbayejani et al., "Recursive Estimation of Motion, Structure, and Focal Length", IEEE Transactions on Pattern Analysis and Machine Intelligence, vol. 17, No. 6, Jun. 1995, pp. 562-575.
Maria I. Riseriro, "Kalman and Extended Kalman Filters: Concept, Derivation and Properties", Feb. 2004, pp. 1-44.
R. Dhaouadi, "Design and Implementation of an Extended Kaiman Filter for the State Estimation of a Permanent Magnet Synchronous Motor", IEEE Transactions on Power Electronics, vol. 6, No. 3, Jul. 1991, pp. 491-497.
M. Quigley et al., "Sub-Meter Indoor Localization in Unmodified Environments with Inexpensive Sensors", pp. 1-8.
Andrew J. Davison, "Real-Time Simultaneous Localisation and Mapping with a Single Camera", Robotics Research Group, Dept. of Engineering Science, University of Oxford, OX1 3PJ, UK, pp. 1-8.

\* cited by examiner

METHODS AND SYSTEMS FOR MULTIMEDIA TRAJECTORY ANNOTATION

TECHNICAL FIELD

The present disclosure relates generally to methods, systems, and computer-readable media for multimedia annotation of trajectories via localization using video acquisition.

BACKGROUND

Global Positioning System (GPS) devices provide fairly accurate location information with many military, civil, and commercial uses. However, GPS devices are generally not suitable for indoor use because GPS signals can be blocked or scattered by roofs and walls. Accordingly, indoor localization techniques are being developed that do not rely on GPS signals.

Mobile devices, such as smartphones, are commonly used to provide location information to a user and often include video cameras and GPS capabilities, allowing for the use of various localization technologies. Most mobile devices additionally include digital displays for interfacing with the user.

Therefore, localization techniques and, in particular, indoor localization techniques can be improved by combining localization information with information that can be displayed to the user via the digital display.

SUMMARY OF THE INVENTION

The present disclosure relates generally to methods, systems, and computer readable media for providing these and other improvements to localization technologies.

In some embodiments, a mobile device can detect an important event that warrants annotation, referred to herein as an annotation event. For example, a user of the mobile device can trigger an annotation event via a touchscreen of the mobile device. In embodiments, the mobile device can then receive an annotation from the user. In further embodiments, the mobile device can determine all or part of the annotation. For example, the mobile device can determine a timestamp to include with a user-submitted annotation. Further, the mobile device can determine a current location using, for example, an embedded video camera of the mobile device. The mobile device can then associate the annotation with the current location.

In additional embodiments, the mobile device can determine a current location and determine that an annotation is associated with the current location. Based on such a determination, the mobile device can output the annotation to the user. For example, the mobile device can display the annotation superimposed on a streaming display from a viewfinder or live-view application of the mobile device.

In some embodiments, the mobile device can determine a current location using image frames received from a video camera. The mobile device can detect feature points and extract feature point information from the image frames. The mobile device can receive subsequent image frames from the video camera and track the feature points from previous image frames in the subsequent image frames. Additionally, the mobile device can detect new feature points in the subsequent image frames to extend the set of feature points or remove old feature points that are no longer in the scene. The mobile device can then estimate the current user location, for example, by using an Extended Kalman Filter on the tracked locations of the feature points.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
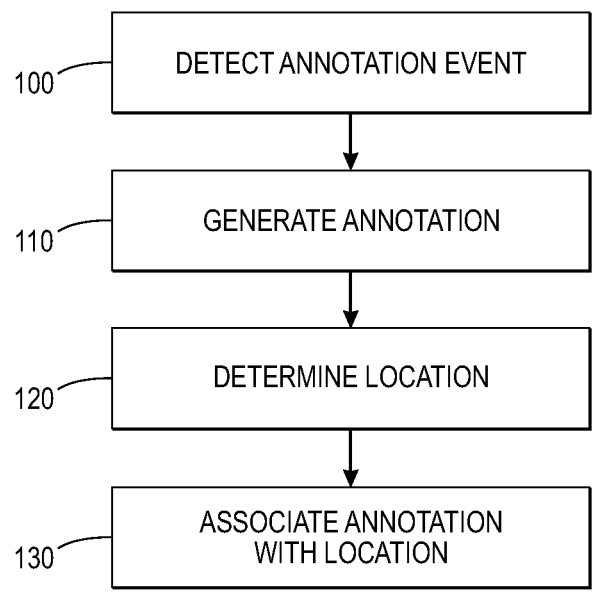
FIG. 1 is a flow diagram illustrating an exemplary method for annotating trajectories on a mobile device, consistent with certain disclosed embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a flow diagram illustrating an exemplary method for annotating trajectories on a mobile device, consistent with certain disclosed embodiments. The process can begin at 100 when a mobile device detects an annotation event.

Annotation events can include user-initiated annotation events and automatic annotation events. User-initiated annotation events can be detected using mobile device inputs that include, but are not limited to, physical buttons, touchscreen buttons, a microphone, a video camera, an accelerometer, and a compass. For example, a user could toggle a physical button on the mobile device or a soft button on a touch screen. Additionally, as further examples, the user could speak an annotation activation command that can be detected via the microphone, perform a gesture that can be detected via the video camera, tap or shake the mobile device in a manner that can be detected via the accelerometer, or change direction in a manner that can be detected via the compass.

Automatic annotation events can be detected using mobile device inputs that include, but are not limited to, a microphone, a video camera, an accelerometer, a wireless communication receiver, and a GPS receiver. For example, the mobile device can detect an automatic annotation event by determining a particular location using the GPS receiver, recognizing a particular location or object using the video camera, determining a current time, or receiving a communication from a nearby mobile device. As used herein, the term "automatic" refers to an action that is not directly initiated by a user.

In 110, the mobile device can generate an annotation. In embodiments, the annotation can include, but is not limited to, an image, video, text, and audio. For example, the mobile device can receive text inputted by the user, receive recorded speech or ambient sound from a microphone, receive an image or video from a video camera, convert recorded speech into text, determine a timestamp, determine a user identification number from a nearby mobile device, etc.

In some embodiments, detecting the annotation event in 100 can be the same step as generating the annotation. For example, the mobile device can receive an annotation as text from a user, and the received text can represent the annotation event and the annotation can be directly generated from the received text.

In 120, the mobile device can determine a current location. For example, the mobile device can determine a current location using GPS, or the mobile device can use an indoor localization technique, such as tracking feature points of a video captured by the mobile device, as discussed below.

In 130, the mobile device can associate the annotation with the current location. In some embodiments such an association can be stored locally on the mobile device. In further embodiments, the association between the annotation and the current location can be transmitted to a central server via, for example, a wireless signal. In still further embodiments, the association between the annotation and the current location can be transmitted to other mobile devices via, for example, Near Field Communication (NFC) standard signals (e.g. BLUETOOTH®, WI-FI®, etc.). For example, an NFC signal transmission can be triggered by sensing another mobile device within NFC communication range, by receiving a prompt from a user, etc.

While the steps depicted in FIG. 1 have been described as performed in a particular order, the order described is merely exemplary, and various different sequences of steps can be performed, consistent with certain disclosed embodiments. For example, in some embodiments, the mobile device can determine a location before or concurrently with detecting an annotation event or generating an annotation. Additional variations of steps can be utilized, consistent with certain disclosed embodiments. Further, the steps described are not intended to be exhaustive or absolute, and various steps can be inserted or removed.

Figure 2:
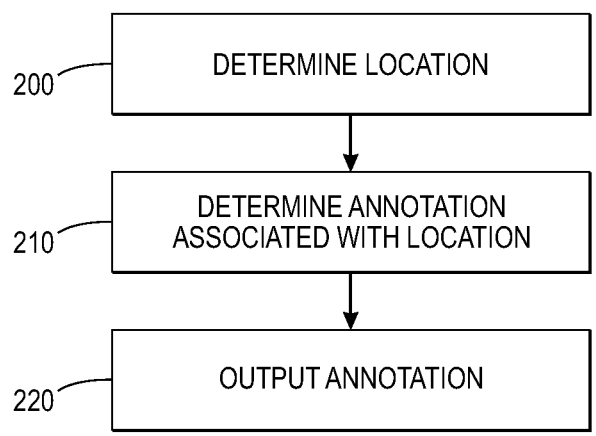
FIG. 2 is a flow diagram illustrating an exemplary method for outputting trajectory annotations on a mobile device, consistent with certain disclosed embodiments.

FIG. 2 is a flow diagram illustrating an exemplary method for outputting trajectory annotations on a mobile device, consistent with certain disclosed embodiments. The process can begin at 200 when a mobile device determines a location. For example, the mobile device can determine the location using GPS, or the mobile device can use an indoor localization technique, such as tracking feature points of a video captured by the mobile device, as discussed below. Additionally, in some embodiments, the mobile device can use a combination of GPS and an indoor localization technique to determine the location. For example, the mobile device can determine that a GPS signal strength is weak or unavailable, and the mobile device can switch to using an indoor localization technique based on such a determination. Alternatively, the mobile device can determine that the GPS signal strength is available or strong, and the mobile device can switch to using GPS localization based on such a determination.

The determined location can be provided, for example, in absolute coordinates (e.g. latitude and longitude, physical address, etc.), relative to a landmark (e.g. distance and direction from a street intersection) or relative to a specific context (e.g. location inside a building).

In 210, the mobile device can determine that one or more annotations are associated with the determined location. In some embodiments, the mobile device can search through locally stored annotations for annotations associated with the current location. In further embodiments, the mobile device can request and receive annotations associated with the determined location from a central server via, for example, a wireless signal. Additionally, the mobile device can receive annotations associated with the current location from another mobile device via, for example, an NFC signal.

In 220, the mobile device can output the annotation to, for example, a digital display screen and/or speakers of the mobile device. In some embodiments, the annotation can be an image, and the mobile device can output the image to the display screen. The image can be superimposed on a streaming display from a viewfinder application of the mobile device. In embodiments, the image can be superimposed on the streaming display from the viewfinder application in a manner that directs the user to the determined location. For example, the image can be an arrow and can indicate a direction that the user should move to go to the determined location.

The streaming display from the viewfinder application can be a digital representation based on a direct feed from a video camera (i.e. live-view) and can display in real time a digital depiction of graphical information received from the video camera. For example, if the video camera is pointed at a wall, the viewfinder application can depict a digital representation of the wall on the display.

As an additional example, the annotation can be text, or a combination of an image and text, which can be displayed on the mobile device. As a further example, the annotation can be an audio file, and the mobile device can output the audio annotation using the speakers of the mobile device or display an audio translated text using the screen of the mobile device.

While the steps depicted in FIG. 2 have been described as performed in a particular order, the order described is merely exemplary, and various different sequences of steps can be performed, consistent with certain disclosed embodiments. Further, the steps described are not intended to be an exhaustive or absolute, and various steps can be inserted or removed.

For example, a step where a user searches for a particular annotation can be inserted. The mobile device can return a list of possible annotations that match the user's search and determine a location associated with the annotation selected by the user. The mobile device can then, for example, display the annotation superimposed on the streaming display from the viewfinder application in a manner that directs the user to the determined location. Additionally or alternatively, the image can include an arrow and can indicate a direction that the user should move to go to the determined location.

As an additional example, the user can search for multiple annotations or input a list of items that could be associated with annotations (e.g. a shopping list), and the mobile device can determine a list of annotations that match the user's search or list of items. The mobile device can determine locations associated with the list of annotations. In some embodiments, the mobile device can create a trajectory based on the determined locations and display an indication to the user of the direction that the user should move to stay on the trajectory. In further embodiments, the mobile device can display one or more of the list of annotations when the mobile device determines that an associated location is in close proximity to the user or is currently within the viewing area of a video camera connected to the mobile device.

Figure 3:
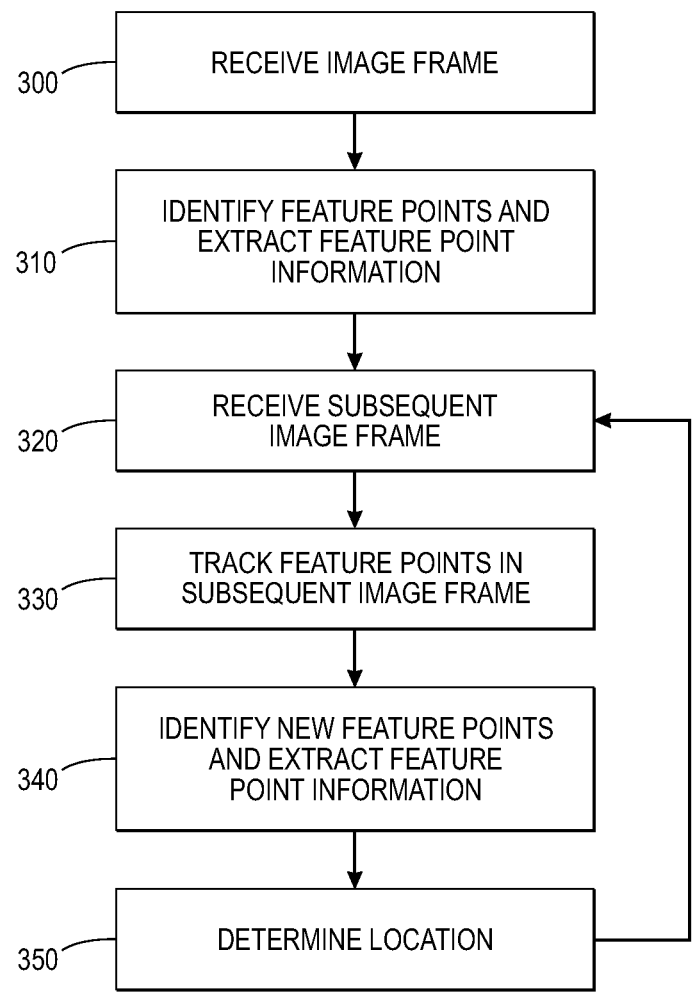
FIG. 3 is a flow diagram illustrating an exemplary method for determining a location of a mobile device using a video camera, consistent with certain disclosed embodiments.

FIG. 3 is a flow diagram illustrating an exemplary method for determining a location of a mobile device using a video camera, consistent with certain disclosed embodiments. The process can begin at 300 when the mobile device receives at least one initial image frame from a video camera. For example, the mobile device can receive an initial image frame of a video streaming from a video camera integrated with the mobile device. The steps described herein can be performed using a single image frame or a sequence of multiple image frames. Accordingly, reference to a single image frame can, in certain embodiments, additionally or alternatively refer to a sequence of multiple image frames.

In 310, the mobile device can detect feature points and extract feature point information from the initial image frame. The detected feature points can be added to a pool of feature points currently being tracked by the mobile device.

For example, feature points can be detected and feature point information for each feature point can be extracted using known algorithms, including corner detection algorithms (e.g. Harris corners detection algorithm), and feature detection algorithms (e.g. Scale-invariant feature transform [SIFT] and Speeded Up Robust Features [SURF]). Additional feature point detection and feature point information extraction methods and algorithms may be used, as known to those of skill in the art.

In embodiments, the extracted feature point information can include feature point image coordinates (e.g. x and y coordinates in pixels), feature point real-world coordinates (e.g. along a particular ray), scale factors, etc.

In 320, the mobile device can receive at least one subsequent image frame from the video camera. The subsequent image frame can represent the current image frame for a single iteration of steps 320-360. For example, the mobile device can receive the current image frame from a video streaming from the video camera integrated with the mobile device, and the position and/or orientation of the camera may have changed such that certain previously identified feature points may no longer remain in the current image frames.

In 330, the mobile device can identify and/or track movement of any previously extracted feature points that remain in the subsequent image frame. Further, in embodiments, feature points from previous image frames that are no longer within the current image frame can be identified and/or removed from the pool of feature points.

In certain implementations, the mobile device can refine feature point locations of previously identified feature points. For example, the feature point image coordinates can be updated to reflect a new position within the image frame. Further, due to the movement of the camera, the mobile device may be better able to identify the feature point real-world coordinates, for example, using a real-world coordinate frame and/or obtaining real-world feature point information (i.e. distance between feature points). The feature point information can be updated accordingly.

In 340, the mobile device can detect new feature points and extract feature point information for the new feature points. For example, the mobile device can use corner detection and/or feature detection algorithms, as described in 310. The mobile device can add the new feature points to the pool of feature points tracked by the mobile device.

In some embodiments, the step of detecting new feature points can be triggered in 330 when a threshold number of previously extracted feature points are no longer within the current image frame. If a threshold number is not met, the mobile device can skip 340.

In 350, the mobile device can determine a current location. In some embodiments, the current location can be determined based on a change in position of the mobile device relative to the initial image frame or to image frames from previous iterations of 320-350. In some embodiments, the mobile device can use the feature point image coordinates and/or feature point real-world coordinates to define a reference coordinate system. Feature point image coordinates and/or feature point real-world coordinates can then be used to estimate a change in position in real-world coordinates as well as a change in rotational perspective of the video camera. For example, the mobile device can estimate the current location by monitoring the trajectory history of feature points. Additionally, in embodiments, the mobile device can use recursive state estimation to estimate the current locating based on the feature points. In further embodiments, a velocity of the video camera in initial, previous, and current image frames can additionally be used to estimate a change in position of the video camera and/or the current location of the mobile device.

In certain implementations, the feature point image positions and/or feature point real-world coordinates can be refined using, for example, an Extended Kalman Filter (EKF) to account for noise, reduce estimation bias in determining feature point positions, and/or reduce covariance magnitudes.

In some embodiments, the mobile device can transmit the current location of the mobile device to, for example, a remote server via a wireless signal, another mobile device via an NFC signal, etc.

The mobile device can proceed to 320 and receive at least one new image frame to begin a new iteration of 320-350.

While the steps depicted in FIG. 3 have been described as performed in a particular order, the order described is merely exemplary, and various different sequences of steps can be performed, consistent with certain disclosed embodiments. Further, the steps described are not intended to be an exhaustive or absolute.

For example, in some embodiments, image frames, including an initial image frame, may be ignored if a threshold image quality is not met and/or a threshold number of feature points are not identified. As an additional example, the mobile device may perform a calibration step before, during, or after the steps described above. Based on the calibration step, the mobile device can convert real-world coordinates in undefined units and scale the coordinates to known units (e.g. centimeters). Additional steps can be inserted or removed, consistent with certain disclosed embodiments.

Figure 4:
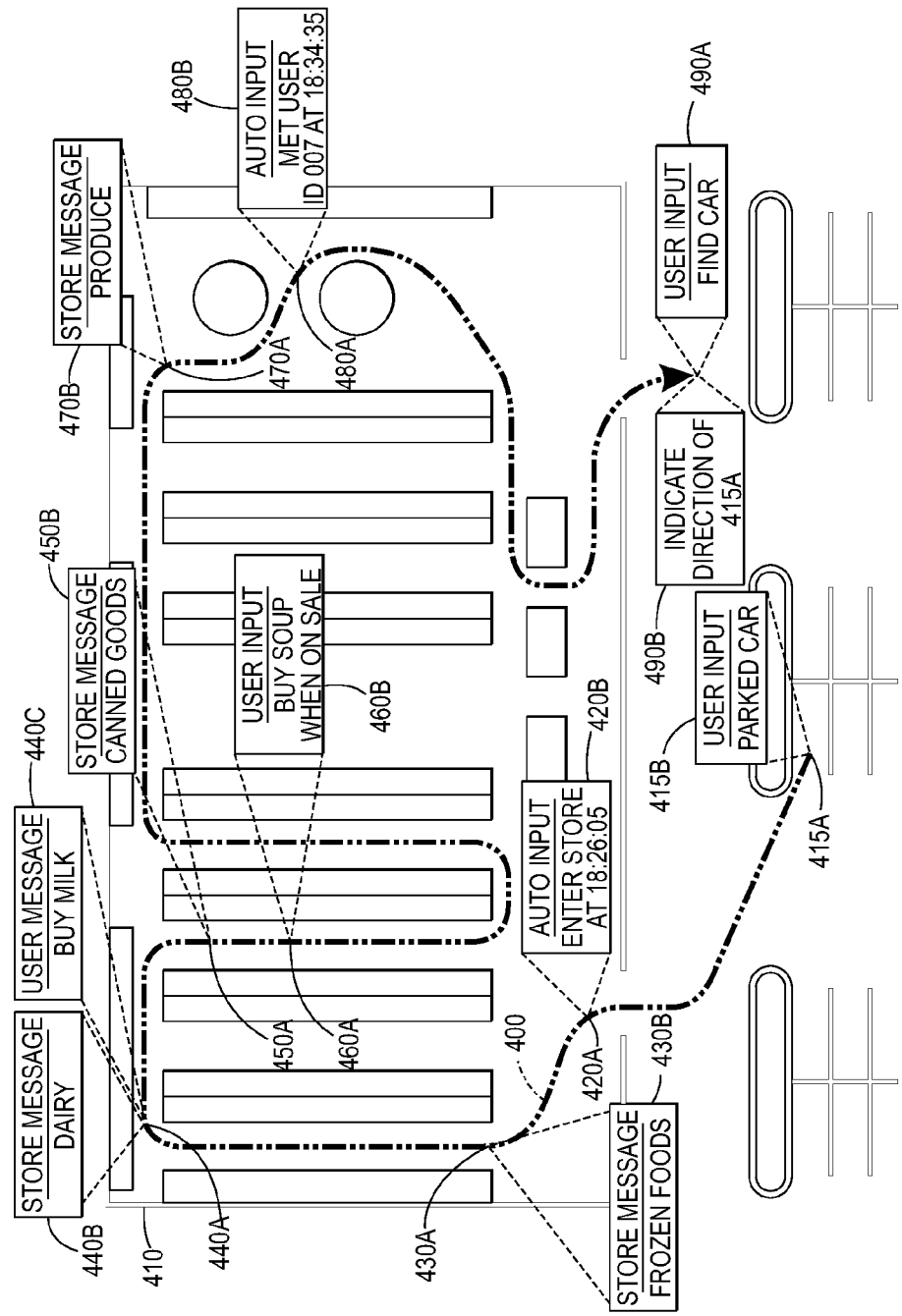
FIG. 4 is a diagram depicting an exemplary annotated trajectory of a user of a mobile device, consistent with certain disclosed embodiments.

FIG. 4 is a diagram depicting an exemplary annotated trajectory of a user of a mobile device, consistent with certain disclosed embodiments. The trajectory of the user and the mobile device is represented by line 400 in this example and shows the path the user takes through grocery store 410. The trajectory, the annotations, and the setting are not intended to be limiting and merely depict an exemplary use of the methods disclosed herein.

The user can initiate an application on the mobile device that activates an integrated video camera and viewfinder application of the mobile device. Using a streaming video received from the video camera, the mobile device can continuously determine the current location of the user and the mobile device. For example, the mobile device can use the localization method described in FIG. 3.

The user can start the process by adding an annotation at location 415A. For example, the user may toggle a button on the mobile device and input annotation 415B "Parked Car" as text. The mobile device can determine that the current location is location 415A and associate location 415A with annotation 415B.

When the mobile device determines that the user is at position 420A, the mobile device can determine that the location is associated with an annotation event. The mobile device can automatically determine that an annotation associated with location 420A is "Enter Store at <TIMESTAMP>." Further, the mobile device can determine that the current time is 18:26:05 and substitute the current time for <TIMESTAMP> to automatically create annotation 420B "Enter Store at 18:26:05" and associate annotation 420B with location 420A.

Further along the trajectory of the user, the mobile device can determine that the mobile device is at position 430A and can determine that annotation 430B "Frozen Foods" is associated with position 430A. Annotation 430B may have been previously created by an employee of grocery store 410. The mobile device can display annotation 430B on a display screen integrated with the mobile device. For example, mobile device can superimpose the annotation over the scene depicted by the viewfinder application.

Subsequently, the mobile device can determine that the mobile device is at position 440A and can determine that annotation 440B "Dairy" is associated with position 440A. Annotation 440B may have been previously created by an employee of grocery store 410. Further the user may have previously created annotation 440C "Buy Milk" that was previously associated with the annotation 440B. Accordingly, the mobile device can simultaneously display annotations 430B and 430C on the display screen integrated with the mobile device.

The mobile device can determine that the mobile device is at position 450A and can determine that annotation 450B "Canned Goods" is associated with position 450A. Annotation 450B may have been previously created by an employee of grocery store 410. The mobile device can display annotation 450B on a display screen integrated with the mobile device The user may then decide to add an annotation to their current location. For example, the user may toggle a button on the mobile device and activate a microphone integrated with the mobile device. The user may say "buy soup when on sale" into the microphone and the mobile device can translate the audio into text using a speech recognition algorithm and create annotation 460B based on the text. The mobile device can determine that the current location is location 460A and associate location 460A with annotation 460B.

The mobile device can determine that the mobile device is at position 470A and can determine that annotation 470B "Produce" is associated with position 470A Annotation 470B may have been previously created by an employee of grocery store 410. The mobile device can display annotation 470B on a display screen integrated with the mobile device.

At a subsequent time, when the mobile device is at position 480A, the mobile device can determine the presence of a second mobile device via, for example, NFC signals. Further the mobile device can determine that the current time is 18:34:35. Additionally, the mobile device can determine that the second mobile device is associated with a user with an identification number of 007 and that the second mobile device and user 007 are associated with a contact entry in an address book of the mobile device. Accordingly, the mobile device can create an automatic annotation 480B "Met User ID007 at 18:34:35" and associate annotation 480B with location 480A. Additionally, the mobile device can exchange information with the second mobile device. For example, the mobile device can exchange trajectory information, annotation information, feature points information, previous location information, etc.

Upon leaving the grocery story, the user may use the mobile device to determine the location of the parked car. The user may initiate a search for an annotation with the word "Car." The mobile device may determine that annotation 415B includes the word "Car" and that location 415A is associated with annotation 415B. Accordingly, in annotation 490B, the mobile device can indicate the direction of location 415A based on the current location of the mobile device. For example, the mobile device can display an arrow on screen to indicate to the user which may to move.

Figure 5:
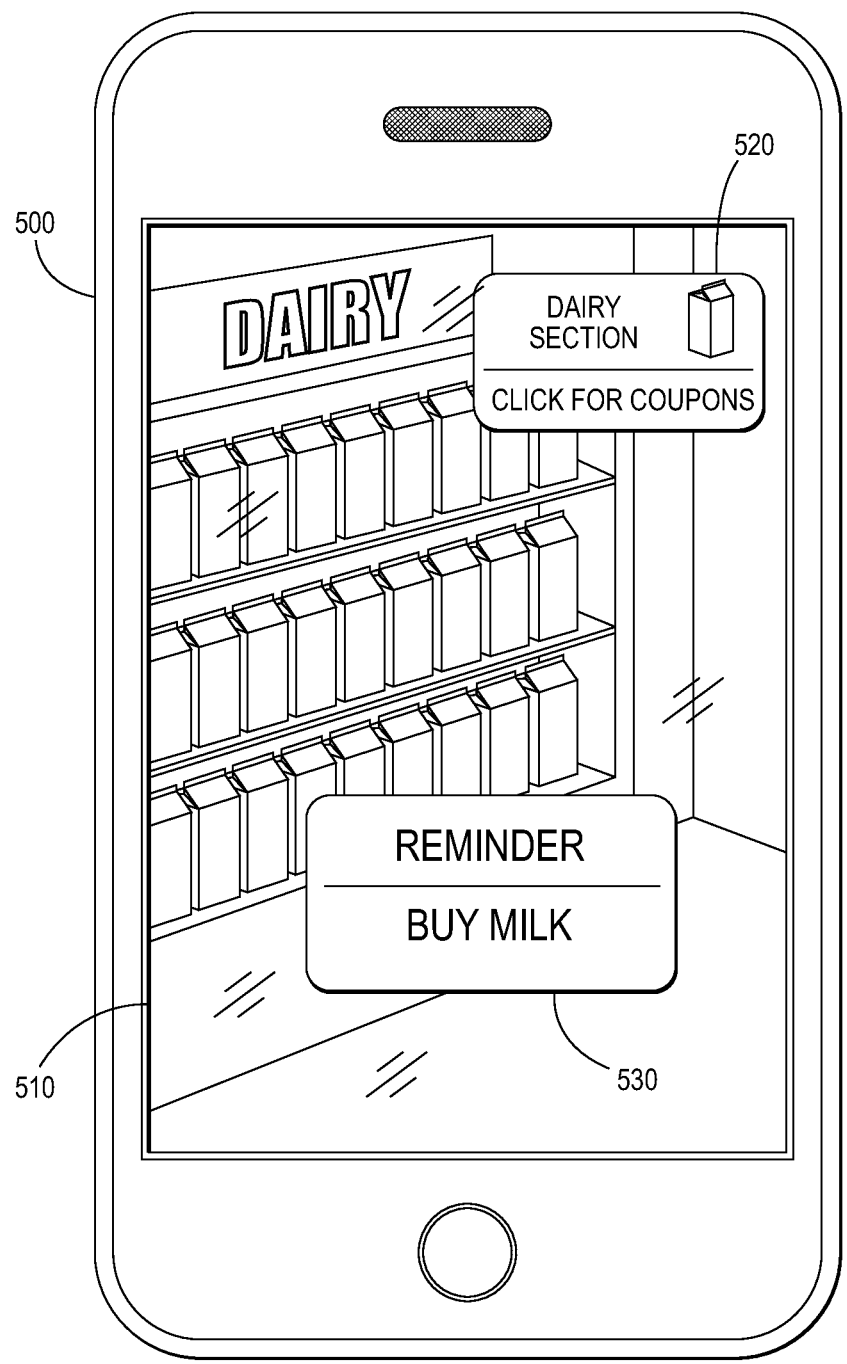
FIG. 5 is a diagram depicting an exemplary display of a mobile device, consistent with certain disclosed embodiments.

FIG. 5 is a diagram depicting an exemplary display of a mobile device, consistent with certain disclosed embodiments. As depicted in FIG. 5, mobile device 500 can have an integrated display 510, which can show a feed from an integrated video camera using a viewfinder application. The display depicted in FIG. 5 is for the purpose of illustration only and is not intended to be limiting.

Mobile device 500 can determine a current location. Additionally, mobile device 500 can determine that annotation 520 with the text "Dairy Section—Click for Coupons" and the image of a milk container and annotation 530 with the text "Reminder—Buy Milk" are associated with the current location. Accordingly, mobile device 500 can superimpose annotations 520 and 530 over the feed from the integrated video camera.

Additionally, annotation 520 can further be associated with an internet address. Accordingly, upon a user activation of annotation 520, display 510 can be redirected to the internet address, and the internet address can be associated with coupons for milk.

Figure 6:
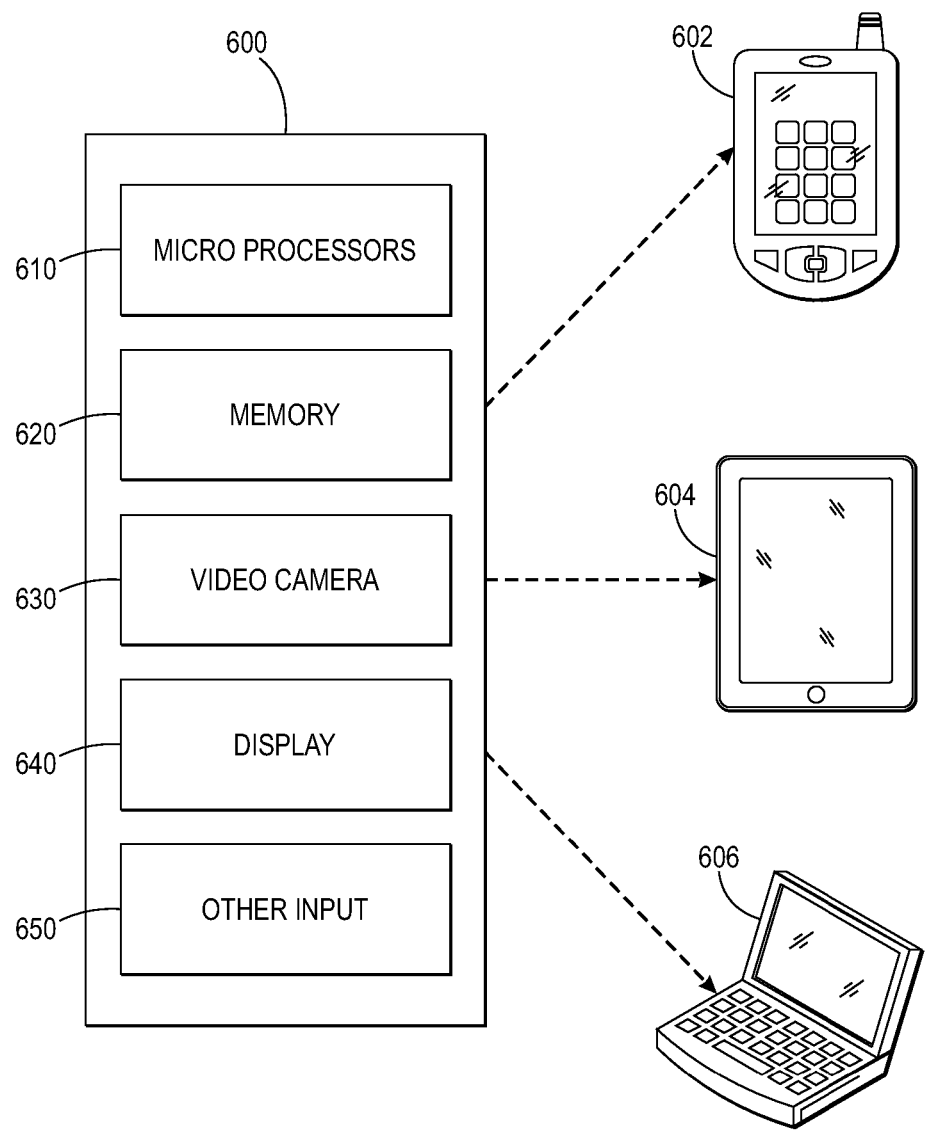
FIG. 6 is a diagram depicting an exemplary mobile device that may utilize trajectory annotation and localization technologies, consistent with certain disclosed embodiments.

FIG. 6 is a diagram depicting an exemplary mobile device that may utilize trajectory annotation and localization technologies, consistent with certain disclosed embodiments. Computing device 600 may represent any type of one or more computing devices able to receive input from a video camera 630 and output to display 640. For example, computing device 600 may represent cellular phone 602, tablet computer 604, or laptop 606. Additionally, in some embodiments, video camera 630 and display 640 can be integrated with computing device 600.

Computing device 600 may include, for example, one or more microprocessors 610 of varying core configurations and clock frequencies; one or more memory devices or computer-readable media 620 of varying physical dimensions and storage capacities, such as flash drives, hard drives, random access memory, etc., for storing data, such as images, files, and program instructions for execution by one or more microprocessors 610; one or more transmitters for communicating over network protocols, such as Ethernet, code divisional multiple access (CDMA), time division multiple access (TDMA), etc. One or more microprocessors 610 and one or more memory devices or computer-readable media 620 may be part of a single device as disclosed in FIG. 6 or may be contained within multiple devices. Those skilled in the art will appreciate that the above-described componentry is exemplary only, as computing device 600 may comprise any type of hardware componentry, including any necessary accompanying firmware or software, for performing the disclosed embodiments.

Furthermore, computing device 600 can include additional input devices 650 that are integrated with the device or capable of sending information to the device. Such input devices can include, but are not limited to, a microphone, an accelerometer, a gyroscope, a proximity sensor, and a global positioning sensor.

What is claimed is:

1. A method of providing annotated trajectories, the method comprising:
   receiving at least one image frame from a video camera of a mobile device, wherein the at least one image frame comprises at least one feature point;
   determining a location based on the at least one feature point of the at least one image frame;
   generating an annotation;
   associating the annotation with the location;
   determining that a second mobile device is nearby;
   determining that the second mobile device is associated with an entry of a contact in an address book of the mobile device;
   communicating with the second mobile device;
   generating a second annotation automatically as a new event based on the communication with the second mobile device,
   determining that a third annotation is associated with the location and an object in the at least one image frame; and
   displaying, on a display of the mobile device, a visual representation of the third annotation that overlays a portion of the at least one image frame,
   wherein determining the location based on the at least one feature point of the at least one image frame comprises:
      identifying the at least one feature point in the at least one image frame from the video camera;
      determining feature point information for the at least one feature point;
      receiving at least one subsequent image frame from the video camera; and
      identifying the at least one feature point in the at least one subsequent image frame from the video camera, wherein the location is determined based on changes in positions of the at least one features point between the at least one image frame and the at least one subsequent image frame.

2. The method of claim 1, wherein generating the annotation is triggered by audio received via a microphone, a current time matching a pre-specified time stamp, input received from the user, or a combination thereof.

3. The method of claim 1, wherein the annotation is automatically generated based on the location, audio received via a microphone, a current time, input received from a user, or combinations thereof.

4. The method of claim 1, wherein:
   the annotation is generated based on an input by a user; and
   the input by the user is voice, text, a touch, a shake, or a combination thereof.

5. The method of claim 1, further comprising:
   receiving a search query from a user;
   determining that the search query matches one or more aspects of the annotation; and
   displaying an indication of a direction of and distance to the location.

6. A method of providing annotated trajectories, the method comprising:
   receiving at least one image frame from a video camera of a mobile device, wherein the at least one image frame comprises at least one feature point;
   determining a location based on the at least one feature point of the at least one image frame;
   determining that the location and an object in the at least one image frame is associated with an annotation;
   displaying, on a display of the mobile device, a visual representation of the annotation that overlays a portion of the at least one image frame;
   determining that a second mobile device is nearby;
   determining that the second mobile device is associated with an entry of a contact in an address book of the mobile device;
   communicating with the second mobile device; and
   generating a second annotation automatically as a new event based on the communication with the second mobile device,
   wherein determining the location based on the at least one feature point of the at least one image frame comprises:
      identifying the at least one feature point in the at least one image frame from the video camera;
      determining feature point information for the at least one feature point;
      receiving at least one subsequent image frame from the video camera; and
      identifying the at least one feature point in the at least one subsequent image frame from the video camera, wherein the location is determined based on changes in positions of the at least one features point between the at least one image frame and the at least one subsequent image frame.

7. The method of claim 6, wherein the annotation comprises textual information, an image, an audio file, a video file, or a combination thereof.

8. The method of claim 6, further comprising:
   generating an new annotation; and
   associating the new annotation with the location.

9. The method of claim 8, wherein the new annotation is automatically generated based on the location.

10. The method of claim 8, wherein:
    the annotation is generated based on an input by a user; and
    the input by the user is voice, text, a touch, a shake, or a combination thereof.

11. A system for providing annotated trajectories comprising:
    a processing system comprising one or more processors; and
    a memory system comprising one or more computer-readable media, wherein the one or more computer-readable media contain instructions that, when executed by the processing system, cause the processing system to perform operations comprising:
       receiving at least one image frame from a video camera, wherein the at least one image frames comprises at least one feature point;
       determining a location based on the at least one feature point of the at least one image frame;
       generating an annotation;
       associating the annotation with the location;
       determining that a mobile device is nearby;
       determining that the mobile device is associated with an entry of a contact in an address book of the system;
       communicating with the mobile device;

generating a second annotation automatically as a new event based on the communication with the mobile device;

determining that a third annotation is associated with the location and an object in the at least one image frame; and displaying, on a display, a visual representation of the third annotation that overlays a portion of the at least one image frame;

wherein determining the location based on the at least one feature point of the at least one image frame comprises:

identifying the at least one feature point in the at least one image frame from the video camera;

determining feature point information for the at least one feature point;

receiving at least one subsequent image frame from the video camera; and identifying the at least one feature point in the at least one subsequent image frame from the video camera, wherein the location is determined based on changes in positions of the at least one features point between the at least one image frame and the at least one subsequent image frame.

12. The system of claim 11, wherein the annotation is automatically generated.

13. The system of claim 11, wherein:

the annotation is generated based on an input by a user; and the input by the user is voice, text, a touch, a shake, or a combination thereof.

14. The method of claim 1, wherein the second annotation indicates a meeting with the contact, an identifier of the contact, a time of the meeting, and a location of the meeting along the trajectory.

15. The method of claim 14, wherein the information exchanged with the second mobile device includes information describing the trajectory of the mobile device and previous location information of the mobile device.

* * * * *